UNITED STATES PATENT OFFICE.

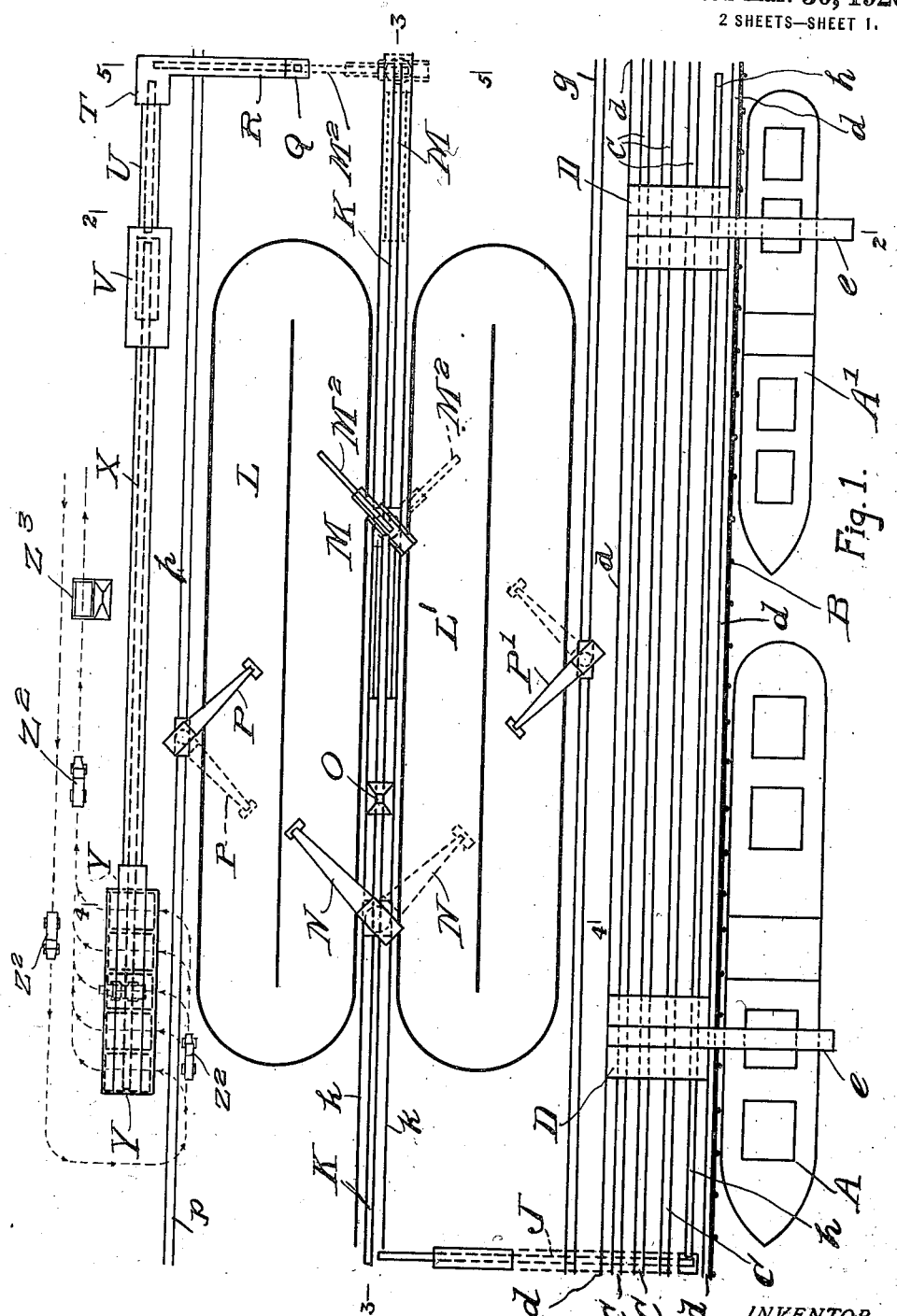

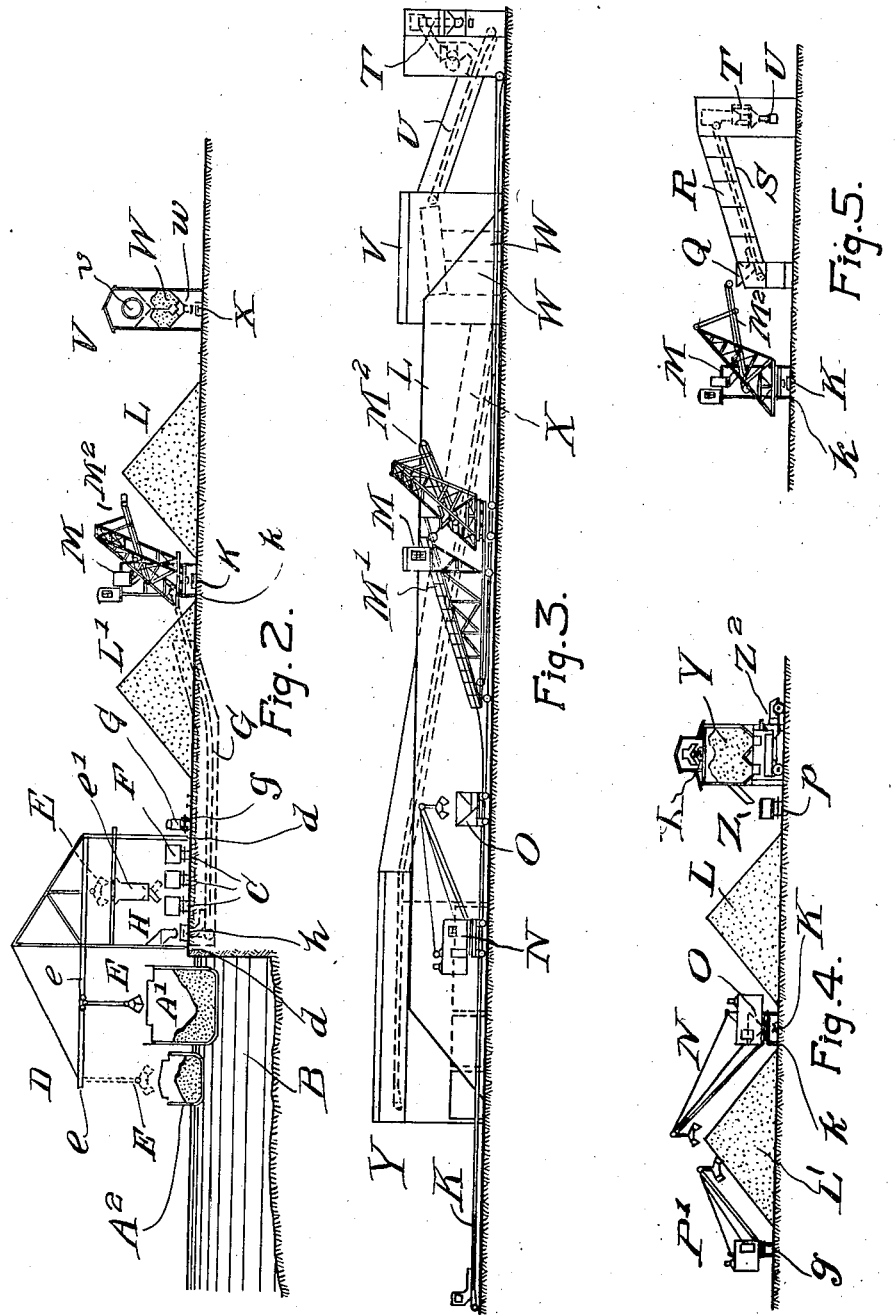

FRANCIS LEE STUART, OF NEW YORK, N. Y.

CONVEYING SYSTEM.

1,335,455.

Specification of Letters Patent.   Patented Mar. 30, 1920.

Application filed October 16, 1919.  Serial No. 331,102.

*To all whom it may concern:*

Be it known that I, FRANCIS LEE STUART, a citizen of the United States, residing at New York city, county and State of New York, have invented certain new and useful Improvements in Conveying Systems, of which the following is a specification.

This invention relates to conveying systems, in which material, such as coal, is received from carriers, such as boats, ships, or other vessels, and conveyed to places of storage, where it is delivered and from which it may be taken for loading other conveyers, carriers, or other receptacles.

The particular object of my present invention is to provide a system for unloading material from vessels and transferring it by suitable apparatus and conveyers to carriers, such as railway cars to other vessels, or to places for storage in the open, or to bins or other receptacles from which it may be taken as required for loading conveyers or carriers which transfer it to places of storage or for immediate use.

This system is shown in the accompanying drawings, in which:—

Figure 1 is a plan view of the system.

Fig. 2 shows a transverse section on the line 2—2 of Fig. 1.

Fig. 3 shows a longitudinal section on the line 3—3 of Fig. 1.

Fig. 4 shows a cross section on the line 4—4 of Fig. 1, and

Fig. 5 is an end elevation of part of the apparatus.

A, A' indicate vessels which bring material to the dock B, along which are placed a plurality of railway tracks C. Unloading apparatus D is mounted to move or to be shifted from place to place on tracks $d$ running parallel with the edge of the dock. The unloading apparatus may be of any suitable construction to lift the material from the vessels and deliver it to suitable conveyers or carriers. As shown, the apparatus comprises a frame supported on the tracks $d$ and provided with an extensible arm or boom $e$ carrying an elevated bucket E. The boom may be extended or retracted so as to deliver either to the hopper $e'$ or to other vessels $A^2$ lying along-side the vessels A, A'. By means of the extensible boom the bucket or gathering device E may be placed over different parts of a vessel or may be arranged in proper position relatively to vessels that vary in distances from the dock. Material delivered by the bucket E to the hopper $e'$ may be delivered by said hopper to cars F on the tracks C. Preferably the hopper is provided with weighing devices of well known construction. Or the material may be delivered to trucks or cars G running on a track $g$. These cars or trucks may carry the material to any desired distant place. When, however, it is desired to convey the material to places for storage in a plant, the material is delivered through a hopper H to a conveyer $h$ running parallel with the edge of the dock. This conveyer $h$ delivers to another conveyer J, which in turn delivers to a conveyer K running longitudinally through the plant. On opposite sides of the conveyer K there are storage spaces or areas on which piles of material L, L' may be formed. Material is delivered from the conveyer K to the storage spaces by means of a delivery apparatus M of well known construction provided with a tripper M' and with a delivering boom $M^2$. The delivering apparatus travels on tracks $k$ parallel with the belt K. By such apparatus material may be piled as indicated at L, L' on both sides of the main conveyer belt K. The delivering apparatus may be moved back and forth on the track $k$ so as to deliver at any desired place longitudinally in the storage spaces. N indicates a reclaiming apparatus of well known construction which travels on the track $k$ and may be operated to gather material from either of the piles L, L' and deliver it to a feeder O, also traveling on the track $k$. This reclaiming apparatus may be turned about a vertical axis so as to gather material from the piles and deliver it to the feeder O, which may be shifted from place to place with the reclaimer as circumstances require.

Material which cannot be gathered from the piles by the reclaimer N is placed within its reach by locomotive cranes P, P' or similar apparatus, which are mounted to move over tracks $g$ and $p$ parallel with the track $k$. The tracks $g$ and $p$ may be of standard gage and these tracks may be used when desired to support railway cars or trucks of ordinary construction which may receive material and convey it to distant points.

It will be understood that the delivering apparatus M may be employed to make the piles L, L' or it may be used to deliver material received by the belt K either from the vessels or from the piles to other conveyers or carriers. As shown in the drawings, the delivering apparatus M may be moved to the end of the track $k$ (Fig. 1) and its extensible boom $M^2$ may be placed to deliver the material to a hopper Q which discharges onto a conveyer R, housed in an elevated structure S and delivering to a crusher T, where the material is broken to the desired size or grade and then passes to a conveyer U by which it is transferred to a screening machine V, where the screen $v$ divides the material into different sizes or grades. The screened material passes to bins W provided with gates $w$, by which the delivery of the material may be controlled. When a sufficient quantity of material has accumulated in the bins, it is delivered to the conveyer belt X which carries it to storage bins Y from which it may be delivered when required, either to cars Z (Fig. 4), on the track $p$ or to trucks $Z^2$, which may be weighed on scales $Z^3$ and which may convey the material, such as coal, to any desired place.

By this system, material received in vessels may be distributed in various ways. It may be delivered to other vessels or to cars or trucks which convey it to distant points, or it may be placed in open storage areas, or it may be taken from vessels or from the storage areas, crushed or sub-divided when desired, screened, and placed in bins or receptacles from which it may be discharged onto trucks for city use or onto other carriers which convey it to distant points. The bins Y are elevated in the manner indicated in Fig. 4 so that the trucks $Z^2$ may pass under them and receive material through the gates with which the bins are provided. As indicated in Fig. 1, the trucks $Z^2$ may pass under the bins in the direction indicated by the arrows and then pass out and over the scales $Z^3$ without interference, the trucks entering in one path and passing out and on in another path. The piles of material in the storage areas may be of large dimensions, and provision is made, as has been before explained, for gathering material in places remote from the reclaiming apparatus, and placing it within reach of such apparatus so that the piles may be cleaned up quite thoroughly when the supply is reduced. This last mentioned feature of the system has been found to be of great practical importance.

I claim as my invention:—

1. A conveying system for receiving and delivering material, comprising unloading apparatus by which material is gathered from vessels or other carriers, conveyers for carrying material to storage spaces, means for transferring material from the unloading apparatus to said conveyers, means for forming piles of material in said storage spaces, means for gathering material from said piles, and additional means for gathering material from the piles and placing it within reach of said first mentioned gathering means.

2. A conveying system for receiving and delivering material, comprising unloading apparatus by which material is gathered from vessels or other carriers, conveyers for carrying material to storage spaces, means for transferring material from the unloading apparatus to said conveyers, means for delivering material from said conveyers to the storage spaces to form piles therein, other places for storage, means for gathering material from the piles, and transferring it to said last mentioned places for storage, and means for gathering material from the piles and placing it within reach of the first mentioned gathering means.

3. A conveying system for receiving and delivering material, comprising unloading apparatus by which material is gathered from vessels or other carriers, means for delivering material from said unloading apparatus to cars or similar carriers by means of which it may be transported to distant points, means for delivering material from the unloading apparatus to conveyers which carry it to storage spaces, means for forming piles of material in said storage spaces, bins or similar receptacles for the material, means for gathering material from the piles and conveying it to said bins, and means for gathering material from the piles and placing it within reach of said first mentioned gathering means.

4. In a conveying system, a conveyer belt, a delivery apparatus connected therewith for forming a pile of material delivered to said apparatus by the conveyer belt, a conveyer to which said apparatus delivers and which transports material to another place for storage, means for gathering material from the piles and transferring it to said first mentioned conveyer belt, and other apparatus for gathering material from the pile and placing it within reach of said first mentioned gathering means.

5. A conveying system, comprising a place for storage, a conveyer belt adjacent thereto, a delivering apparatus associated with said belt and receiving material therefrom, a conveyer to which said apparatus delivers, means for gathering material from storage and placing it on said first mentioned conveyer, and means for gathering material from storage and placing it within reach of said first mentioned gathering means.

In testimony whereof, I have hereunto subscribed my name.

FRANCIS LEE STUART.